(12) United States Patent
Hepler

(10) Patent No.: US 9,415,535 B2
(45) Date of Patent: Aug. 16, 2016

(54) MULTISTAGE EJECTION OF AN INJECTION MOLDED MATERIAL

(71) Applicant: Douglas Christopher Hepler, Rochester, NY (US)

(72) Inventor: Douglas Christopher Hepler, Rochester, NY (US)

(*) Notice: Subject to any disclaimer, the term of this patent is extended or adjusted under 35 U.S.C. 154(b) by 84 days.

(21) Appl. No.: 14/538,842

(22) Filed: Nov. 12, 2014

(65) Prior Publication Data

US 2016/0129618 A1    May 12, 2016

(51) Int. Cl.
  *B29C 45/40*    (2006.01)
(52) U.S. Cl.
  CPC ..... *B29C 45/4005* (2013.01); *B29C 2045/4084* (2013.01)
(58) Field of Classification Search
  CPC ............... B29C 2045/4015; B29C 2045/4021; B29C 2045/4026; B29C 2045/4084
  See application file for complete search history.

(56) References Cited

U.S. PATENT DOCUMENTS

| | | | | |
|---|---|---|---|---|
| 3,893,644 A | * | 7/1975 | Drazick | B29C 33/442 249/68 |
| 4,050,666 A | * | 9/1977 | Van Tichelt | B28B 7/10 249/68 |
| 4,231,987 A | * | 11/1980 | Osawa | B29C 45/1771 264/328.1 |
| 5,472,335 A | * | 12/1995 | Morikita | B29C 45/38 264/334 |
| 5,492,658 A | * | 2/1996 | Ohno | B29C 45/38 264/161 |
| 6,187,247 B1 | * | 2/2001 | Buzzell | B29C 45/33 264/328.1 |

\* cited by examiner

*Primary Examiner* — Ryan Ochylski

(57) ABSTRACT

The present invention relates to an ejection system for an injection molding apparatus comprising: a mold plate, housing a mold cavity consisting a molded material and a plurality of ejector pins arranged in such a way to extend sequentially through the mold cavity in order to push the perimeter of the molded material in a multi-stage sequence.

10 Claims, 8 Drawing Sheets

MULTISTAGE EJECTION OF AN INJECTION MOLDED MATERIAL

FIELD OF THE INVENTION

The present invention generally relates to injection molding technology, and more specifically, to multistage ejection of injection molded materials, off a mold cavity without damaging the molded material in its uncured or non-solidified state.

BACKGROUND OF THE INVENTION

Injection molding is a manufacturing process for producing molded parts or molded products from materials including thermoplastic and thermosetting plastic materials. The molding process typically involves feeding a material to be molded into a heated chamber for melting and then forced under pressure via flow paths into a mold cavity where the material cools and hardens to form a final molded part. The mold cavity is then opened and the final molded part is ejected from the mold cavity.

Conventional injection molding architecture comprises of a stationary mold plate and a movable mold plate, housing a mold cavity to form a molded article in between the plates. The mold plates are held together by a clamping arrangement during a molding cycle. The molded part is ejected from the cavity space of movable mold plate by an ejection mechanism, which involves a plurality of ejector pins sliding in unison through the movable plate in order to contact the surface of the molded part and dislodge the molded part. The ejector pins are actuated by an ejector plate for enabling the pins to slide through the mold plate and alternatively, backward movement of the mold plate which comprises respective channels for slides over the ejector pins fixed to a support plate. During a typical ejection process, the ejector plate is moved forward thereby actuating the pins to simultaneously slide through the mold plate in order to push the molded article off the mold cavity.

However when the molded article does not typically fully harden during the cooling phase of the injection molding cycle, then ejection time has to be delayed until that article turns hard enough to be ejected. Another approach is to employ alternative methods of ejection such as manually pulling the molded part out of the mold or stripping the molded part off a mold cavity using an automated process.

For example, in the case of molded pet treats, if the pet treat dough or mix is not completely solidified at the time of mold opening then subsequent ejection process would damage the product. The damage occurs when all the ejector pins simultaneously press on the surface of molded pet treat in an attempt to eject eventually results in distortion of pet treat due to the pins passing through the non-hardened dough or partial ejection of the molded pet treat from the mold cavity.

Different functional designs of ejection pins adapted to eject the molded material from a mold are known in the art including: single unitary type pins with base portion fixed to the ejector plate; ejector pins adapted to slide through a movable mold plate, wherein the ejector pins are actuated by the movement of ejector plate; and ejector pins with base end flange portions linked to a cylinder rod of an air cylinder, which is fixed to the ejector plate.

Ejection of the molded material from a mold cavity is also carried out by employing angular ejector pins in an injection mold for ejecting a plastic article molded in the injection mold. While mold opening, the angular ejector pin moving at an angle ejects the plastic article out from mold cavities of the injection mold.

Ejection mechanism or ejector devices of injection molding machines known in the art poses limitations such as synchronous movement of unitary ejector pins pushing the surface of a molded material may result in damaging at least parts of the molded material, especially in a non-solidified state during ejection. In another case, a part of the molded material may stick to the cavity thus leading to incomplete ejection and even distorted final molded article at times. Further limitation includes additional wait time for allowing solidification or cooling of the mold material before mold opening which results in delayed molding process.

U.S. Pat. No. 6,491,512 B2 shows a two stage ejection system for an injection mold. U.S. Pat. No. 7,435,079 B2 discloses an angular ejector pin mechanism for ejecting plastic articles from an injection mold. U.S. Pat. No. 8,393,884 B2 shows an ejector device of an injection molding machine. US patent publication number 20130251837 shows a type of injection molding machine. US patent publication number 20060172037 shows ejection of molded part using a decelerated ejector pin.

Accordingly, there exists a need for an efficient method for ejecting a molded part or product from a mold cavity without damaging the molded part or product in an unsolidified or uncured state.

SUMMARY OF THE INVENTION

The present invention relates to a multi-stage ejection system for an injection molding apparatus comprising a mold plate housing a molded material in a mold cavity. The system further comprises a plurality of ejector pins adapted to extend through the mold cavity in a progressive sequence so as to asynchronously engage with a surface of the molded material for multistage ejection from the mold cavity without damaging any part of the molded material.

In an embodiment, the ejection system comprises a retainer plate operatively coupled to an ejector plate, adapted to move towards the mold plate. A plurality of ejector pins disposed at different counterbore depths of the retainer plate are sequentially actuated by a plurality of knock out rods extending through the ejector plate during movement of the ejector-retainer plate towards the mold plate. The knock out rods comprises of different lengths correlating with the placement of the ejector pins in the retainer plate. The variation in distance between head of knock out rod and ejector plate surface determines the delay in sequence of actuation between ejector pins for multistage ejection of molded material.

In another embodiment, the ejection system for an injection molding apparatus comprises an ejector plate housing a plurality of ejector pins adapted to extend through the mold cavity in a predetermined sequence to push the surface of the molded material for multi stage ejection. Each of the plurality of ejector pin is sequentially actuated by an actuator control comprising a drive means selected from hydraulic drive, pneumatic drive and servomechanism.

DETAILED DESCRIPTION OF THE INVENTION

The structure and the technical means adopted by the present invention to achieve the above and other objects can be best understood by referring to the following detailed description of the preferred embodiments and the accompanying drawings.

The present invention relates to a system for sequential ejection or multi-stage ejection of a molded material from a mold cavity of a mold plate, without causing damage to any part of the molded material. Multi stage ejection of an injection molded material has broad applicability for a variety of molded materials, and is discussed below in the context of a molded pet treat, comprising a pet food. An exemplary structure of injection molded pet treat consists of a dog bone shaped structure.

Multi-stage ejection according to an embodiment of the present invention comprises a plurality of ejector pins extending through the mold plate and contacting the predetermined ejection spots on the surface of molded material in a sequential order to exert a series of pushes. The ejection spots are also known as push regions, which are pushed by the ejector pins in a predetermined sequence for gradually ejecting the molded material off the mold cavity without causing any structural damage to the molded material.

Figure 1A:
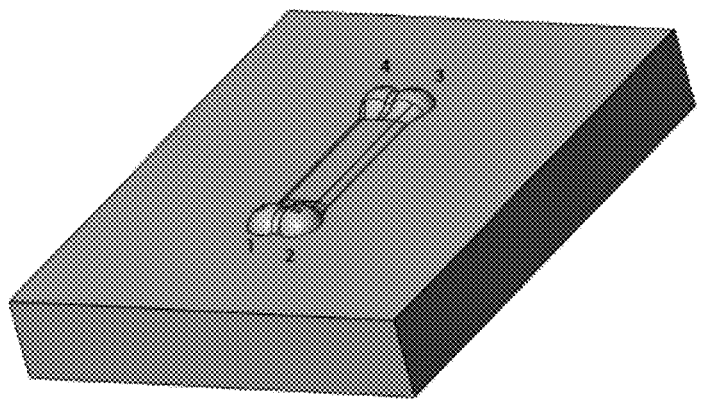
FIG. 1A-1E shows a schematic illustration of multiple stages of ejection of a molded pet treat from a mold cavity according to an embodiment of the present invention.
Figure 1B:
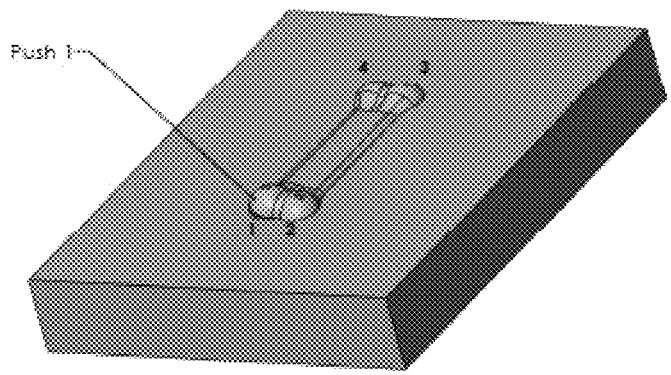
Figure 1C:
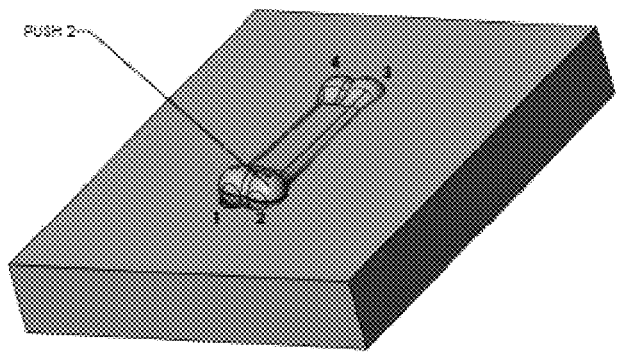
Figure 1D:
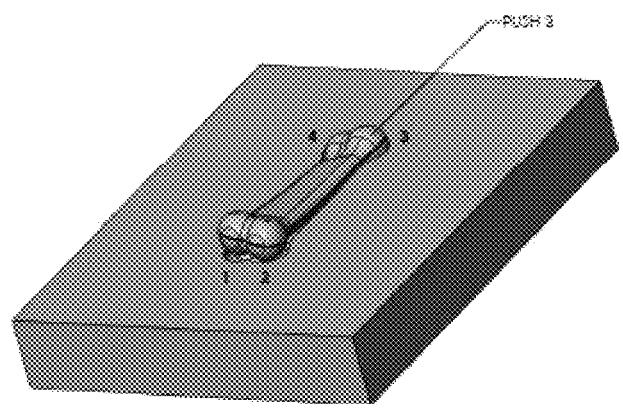
Figure 1E:
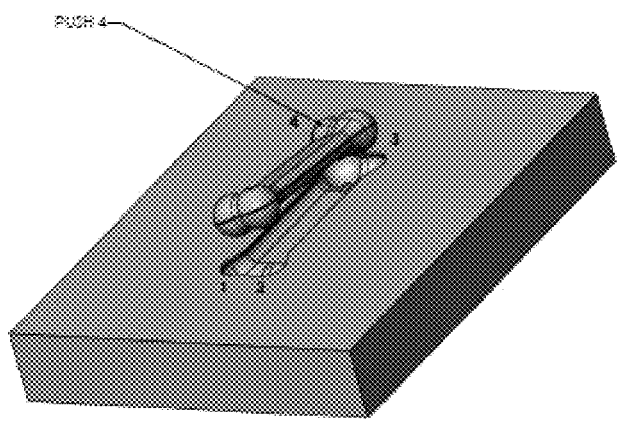

Referring to FIG. 1A-FIG. 1E, which shows multiple stages of ejection of a molded pet treat from a mold cavity according to an embodiment of the present invention. In an exemplary embodiment, each ejection stage comprises displacement of a predetermined region of the molded pet treat out of the mold cavity. FIG. 1A shows initial position of the molded pet treat in the mold cavity. FIG. 1B illustrates displacement of push region 1 of the pet treat during first stage of ejection and FIG. 1C shows displacement of push region 2 of the pet treat during second stage of ejection. Similarly FIG. 1D and FIG. 1E shows displacement of push region 3 during third stage of ejection and push region 4 during fourth stage of ejection respectively.

The molded pet treat, which is molded from a dough or a mix comprising animal or pet food ingredients is prone to distortion during conventional ejection involving synchronous movement of ejector pins through the mold plate to push the molded pet treat off the mold cavity, especially in an uncured state. Whereas, sequential ejection according to an embodiment of the present invention comprises the plurality of ejector pins sequentially extending through the mold cavity to push the predetermined ejection spots on the surface of molded material in multiple stages or multiple sequence for gradual ejection of the molded material off the mold cavity.

Figure 2:
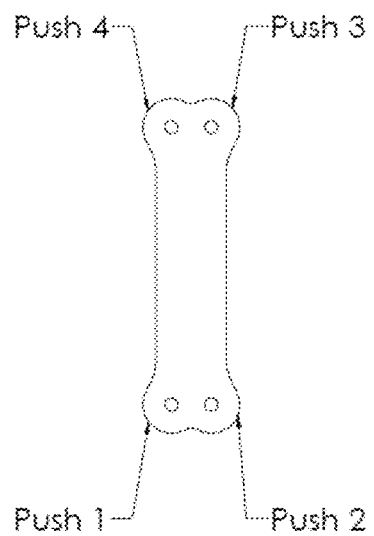
FIG. 2 shows a molded pet treat comprising predetermined ejection spots.

FIG. 2 shows a perspective view of a molded pet treat comprising predetermined ejection spots. The push region 1 will be ejected during first stage of ejection, followed by push region 2, push region 3 and push region 4 during subsequent stages of ejection. The push regions are contacted by ejector pins which can be configured in different ways according to the desired sequence of ejection. For example, the ejector pins can be arranged in rows parallel to each other, wherein the ejector pins are in the same line or offset from each other. In another example, the ejector pins can be arranged in one or more series, wherein the ejector pin arrangement is determined based on factors including mold shape, type of material to be molded and similar properties.

Figure 3A:
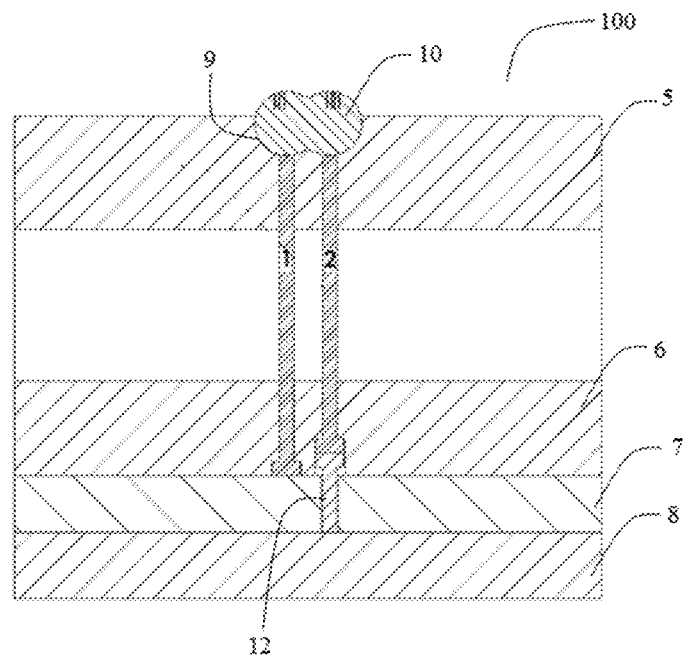
FIG. 3A shows a sectional view of an ejection system for an injection molding apparatus according to an embodiment of the present invention.

In an embodiment, the ejection system comprises a plurality of ejector pins extending through the mold cavity to push the predetermined ejection spots on the surface of molded material in a sequential order. FIG. 3A shows a sectional view of an ejection system 100 for an injection mold apparatus, the system 100 comprises a mold plate 5 housing a molded pet treat 10 in a mold cavity 9. The system 100 further comprises a retainer plate 6 operatively coupled with an ejector plate 7, adapted to move towards the mold plate 5 during ejection. A plurality of ejector pins 1, 2 (pins 3, 4 not shown in this view) disposed at different counterbore depths of the retainer plate 6 are sequentially actuated by a plurality of knock out rods 12 (knockout rods 13, 14 not shown in this view) extending through the ejector plate 7 during movement of the ejector-retainer plate towards the mold plate 5. The system 100 comprises a mold back up plate 8 in a fixed position adjacent to the ejector plate 7.

The knock out rods comprises of different lengths correlating with the placement of the ejector pins in the retainer plate. The variation in distance between head of knock out rods and ejector plate 7 surface determines the delay in sequence of actuation between ejector pins for multistage ejection of molded pet treat 10. In FIG. 3A, during initial position, the ejector plate 7 surface is in contact with head of the ejector pin 1, which is disposed at a shallow counterbore depth in the retainer plate 6.

Figure 3B:
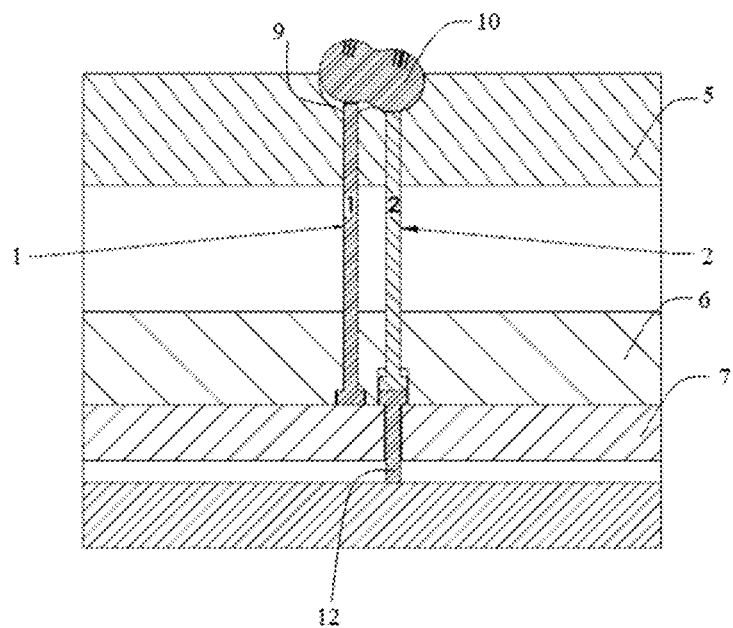
FIG. 3B shows a sectional view of the ejection system for an injection molding apparatus during sequence one of ejection according to an embodiment of the invention.

FIG. 3B shows a sectional view of the ejection system 100, during stage one of ejection. During stage one, the ejector plate 7 moves in unison with retainer plate 6 towards the mold plate 5, during which the ejector pin 1 is actuated to extend through the mold cavity 9 of the mold plate 5 to push one of the ejection spot on the surface of molded pet treat 10. Simultaneously, the neck region of the knock out rod 12 comes into contact with the surface of the ejector plate 7, ready to actuate the ejector pin 2. The distance between the neck of knock out rod 12 and the ejector plate 7 surface determines the time delay between actuation of ejector pins 1 and 2.

Figure 3C:
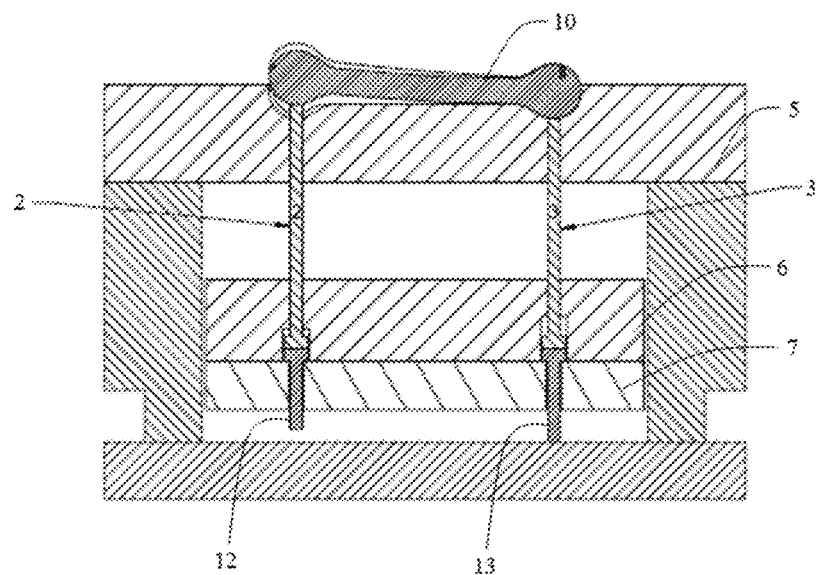
FIG. 3C shows a sectional view of the ejection system for an injection molding apparatus during sequence two of ejection according to an embodiment of the invention.

FIG. 3C shows a lateral sectional view of the ejection system 100, during stage two of ejection. During stage two, the ejector-retainer plate 7, 6 moves further towards the mold plate 5 thereby actuating the knock out rod 12 which in turn actuate the ejector pin 2 to extend through the mold cavity to push second ejection spot on the surface of molded pet treat 10. Simultaneously, the neck region of the knock out rod 13 comes into contact with the surface of the ejector plate 7, ready to actuate the ejector pin 3. The distance between the neck of knock out rod 13 and the ejector plate 7 surface determines the delay between actuation of ejector pins 2 and 3.

Figure 3D:
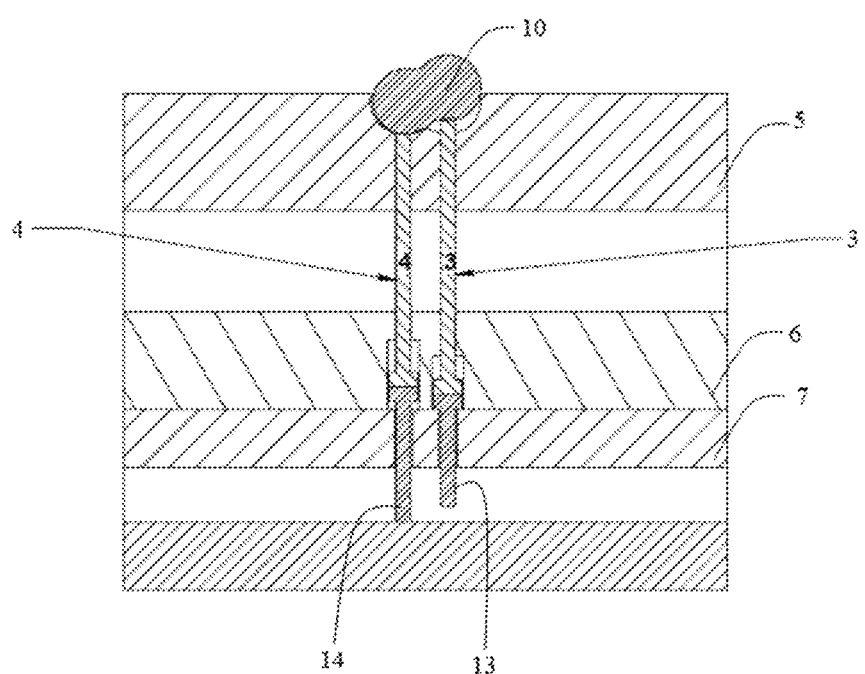
FIG. 3D shows a sectional view of the ejection system for an injection molding apparatus during sequence three of ejection according to an embodiment of the invention.

FIG. 3D shows a sectional view of the ejection system 100, during stage three of ejection. During stage three, the ejector plate 7 moves in unison with retainer plate 6 towards the mold plate 5, thereby actuating the knockout rod 13 which in turn actuate the ejector pin 3 to extend through the mold cavity 9 of the mold plate 5 to push the third ejection spot on the surface of molded pet treat 10. Simultaneously, the neck region of the knock out rod 14 comes into contact with the surface of the ejector plate 7, ready to actuate the ejector pin 4. The distance between the neck of knock out rod 14 and the ejector plate 7 surface determines the time delay between actuation of ejector pins 3 and 4.

Figure 3E:
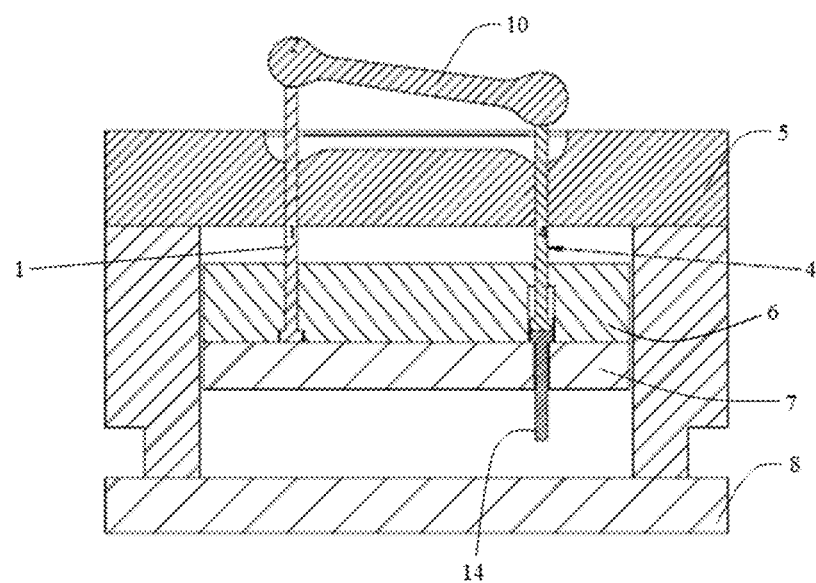
FIG. 3E shows a sectional view of the ejection system for an injection molding apparatus during sequence four of ejection according to an embodiment of the invention.

FIG. 3E shows a lateral sectional view of the ejection system 100, during stage four of ejection. During stage four, the ejector-retainer plate 7, 6 moves further towards the mold plate 5 thereby actuating the knock out rod 14 which in turn actuate the ejector pin 4 to extend through the mold cavity 9 to push the fourth ejection spot on the surface of molded pet treat 10, thus ejecting the molded pet treat completely out of the mold cavity 9. The ejector pin 1 is also extended further during actuation of the remaining ejector pins, leads the ejection.

The counterbore depth, at which each ejector pin is disposed in the retainer plate, determines the sequence of actuation of the ejector pins, which are actuated with a time delay between the pins that correlates with the distance between the ejector plate leading surface and neck portion of the respective knock out rod. The sequence of ejection and time delay between among ejector pins can be predetermined based on the mold shape and type of material to be molded.

In another embodiment, the injection mold ejection system comprises a plurality of ejector pins independently actuated by individual actuators each with a respective controller. The controller comprises a driving means selected from a hydraulic drive or a pneumatic drive or a servomechanism.

Figure 4A:
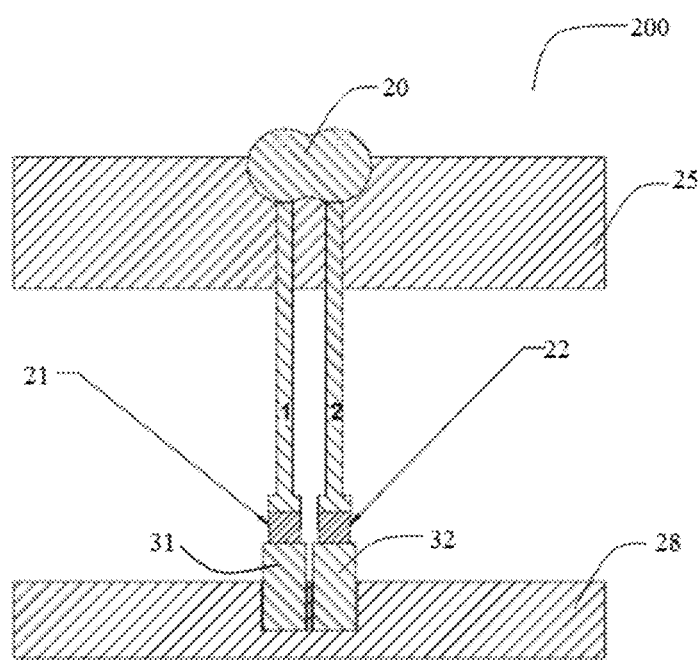
FIG. 4A shows a sectional view of an injection mold ejection system with the ejector pins and actuators at initial position according to an embodiment of the present invention.

FIG. 4A shows a sectional view of an injection mold ejection system during initial position. The system 200 comprises a mold plate 25 housing a molded pet treat 20 in a mold cavity. Plurality of ejector pins 1, 2 independently actuated by actuators 21, 22 respectively. The actuators 21, 22 are actuated in a predetermined sequence, which is controlled by respective controllers 31, 32 fixed to a back-up plate 28.

Figure 4B:
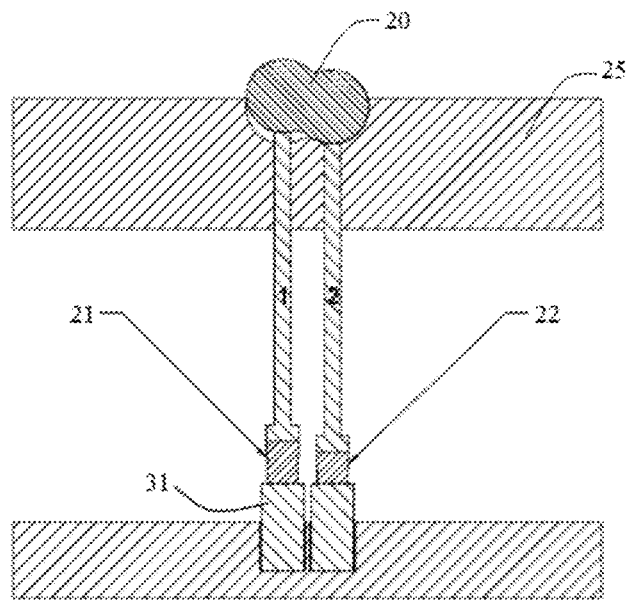
FIG. 4B shows a sectional view of the injection mold ejection system during stage one of ejection according to an embodiment of the invention.

FIG. 4B shows a sectional view of an injection mold ejection system during stage one of ejection. The system comprises a mold plate 25 housing a molded pet treat 20 in a mold cavity. During stage one, the actuator 21 actuates the ejector pin 1 to extend through the mold cavity to push a first ejection region on the surface of the molded pet treat 20, the actuator 21 is in turn regulated by the controller 31. The ejector pin 2 is in original position as actuator 22 is not actuated at this stage.

Figure 4C:
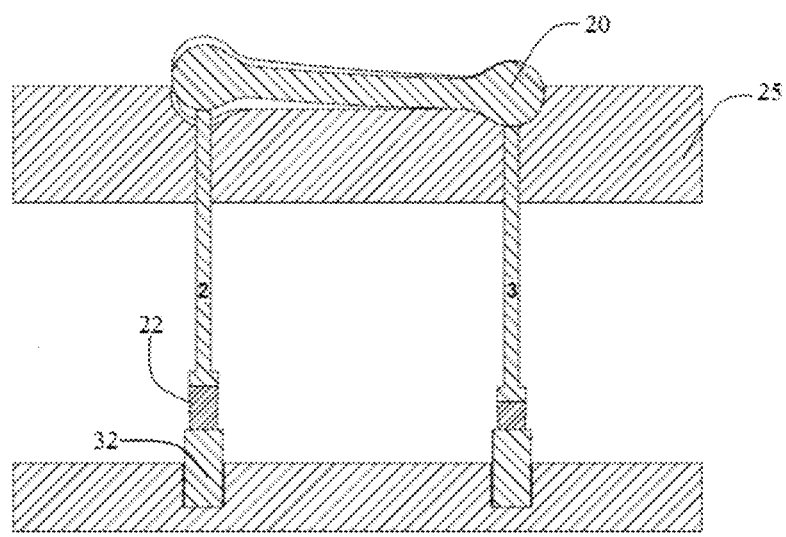
FIG. 4C shows a sectional view of the injection mold ejection system during stage two of ejection according to an embodiment of the invention.

FIG. 4C shows a sectional view of an injection mold ejection system during stage two of ejection. The system comprises a mold plate 25 housing a molded pet treat 20 in a mold cavity. During stage two, the actuator 22 driven by controller 32, actuates the ejector pin 2 to extend through the mold cavity to push a second region on the surface of the molded pet treat 20. The ejector pin 3 remains in its original position at this stage.

Figure 4D:
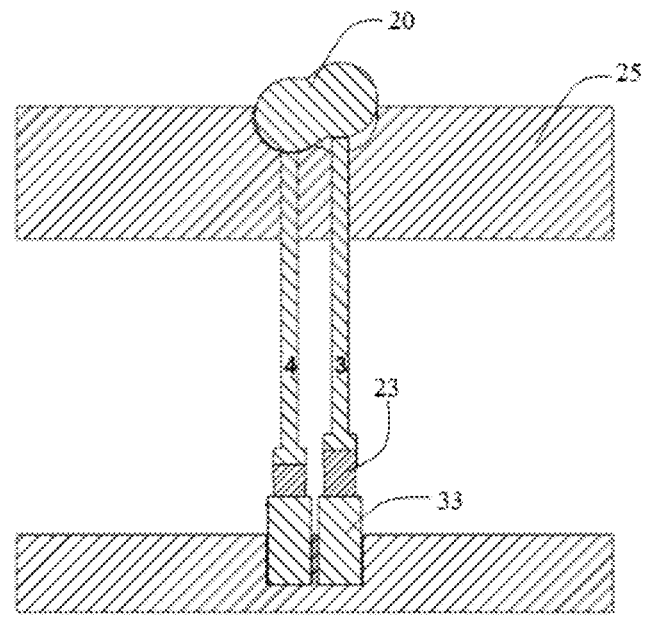
FIG. 4D shows a sectional view of the injection mold ejection system during stage three of ejection according to an embodiment of the invention.

FIG. 4D shows a sectional view of an injection mold ejection system during stage three of ejection. The system comprises a mold plate 25 housing a molded pet treat 20 in a mold cavity. During stage three, the actuator 23 driven by controller 33, actuates the ejector pin 3 to extend through the mold cavity to push a third region on the surface of the molded pet treat 20. The ejector pin 4 remains in its original position at this stage.

Figure 4E:
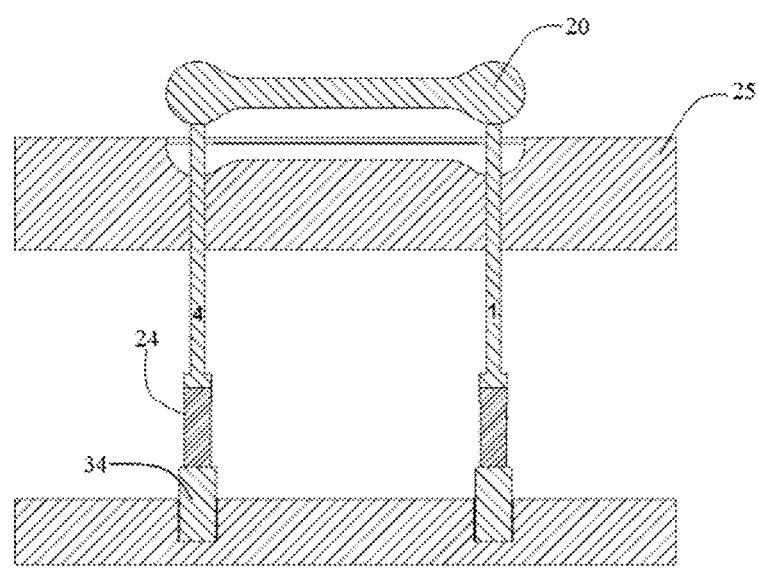
FIG. 4E shows a sectional view of the injection mold ejection system during stage four of ejection according to an embodiment of the invention.

FIG. 4E shows a sectional view of an injection mold ejection system during stage four of ejection. The system comprises a mold plate 25 housing a molded pet treat 20 in a mold cavity. During stage four, the actuator 24 driven by controller 34, actuates the ejector pin 4 to extend through the mold cavity to push a fourth region on the surface of the molded pet treat 20, thus completely ejecting the molded pet treat out of the mold cavity. The ejector pin 1 remains in extended position at this stage.

Each of the ejector pins can be actuated independently by a programmable control connected to a computer system. Actuation of each ejector pin can be timed and regulated by a computer program, thereby attaining sequential actuation of ejector pins for progressive ejection of the molded material from the mold cavity.

The mold plate comprises an undercut portion as a part of the mold cavity, wherein the undercut comprises protrusions or recessions in a part that prevents the mold, after the molded part is formed, from sliding away along the parting direction.

Advantages of sequential ejection according to an embodiment of the present invention include efficient ejection of molded materials or products from the injection mold without any deformation in the product structure. By stripping the molded product out of their mold cavities, a relatively small amount of force may be used to eject the product. Molded products such as pet treats made from dough or mix can be ejected sequentially involving multiple stages of ejection, which prevents from damaging the structure of molded material due to the forces applied by of ejector pins during synchronous ejection employed in convention methods of ejection.

The ejector pins may also comprise an ejector pin or a rod, configured to contact the perimeter and push the molded material off the cavity from an oblique angle. The ejector pin disposed at an oblique angle helps in preventing structural distortion of the molded material due to direct forces exerted by the ejector pins that extends perpendicular to the mold surface.

In an embodiment, the distal end of ejector pins comprises an ejecting surface complementary to the surface of mold cavity or molded material. For example, the ejector pins may comprise a curved ejecting surface at the distal end, which is configured to eject a molded product with a curved surface or curved perimeter.

The present invention has been described with a preferred embodiment thereof and it is understood that many changes and modifications to the described embodiment can be carried out without departing from the scope and the spirit of the invention that is intended to be limited only by the appended claims.

What is claimed is:
1. A multi-stage ejector system for an injection molding apparatus comprising:
  a mold plate housing a molded material within a mold cavity;

an ejector plate operatively coupled to a retainer plate, adapted to move towards the mold plate;

a plurality of ejector pins at different counterbore depths in the retainer plate; and a plurality of knock out rods extending through the ejector plate for actuating the ejector pins in a sequence to extend through the mold cavity for ejecting the molded material, the sequence of actuation is determined by the counterbore depth of ejector pins and time delay between actuation of ejector pins is determined by variation in distance between a neck region of each knock out rod and a leading surface of the ejector plate.

2. The system of claim 1, wherein
the plurality of knock out rods, extending through the ejector plate sequentially actuate the plurality of ejector pins during movement of the ejector-retainer plate.

3. The system of claim 1, wherein each of the plurality of knock out rods comprises a head portion at different position correlating with the counterbore depth of the corresponding ejector pin.

4. The system of claim 1, wherein the distance between head portion of each knock out rod and a leading surface of the ejector plate determines the sequence of actuation of the plurality of knock out rods.

5. The system of claim 1, wherein the sequence of actuation of the plurality of ejector pins correlates with the sequence of ejection at predetermined ejection spots of the molded material.

6. The system of claim 1, further comprises a mold back up plate.

7. The system of claim 1, wherein the molded material comprises a pet treat.

8. The system of claim 1, wherein the length of each knock out rod correlates with the placement of the ejector pins in the retainer plate.

9. The system of claim 1, wherein the mold cavity comprises at least one undercut portion.

10. The system of claim 1, wherein the plurality of ejector pins comprises a distal end surface complementary to a surface of the mold cavity.

* * * * *